United States Patent
Leal et al.

(10) Patent No.: US 10,580,045 B1
(45) Date of Patent: Mar. 3, 2020

(54) PROMOTING CONTENT INTO A CREATIVE

(71) Applicant: Google LLC, Mountain View, CA (US)

(72) Inventors: Marcus A. Leal, Belo Horizonte (BR); Daniel Braga de Faria, Belo Horizonte (BR); Juliano Ferraz Ravasi, Belo Horizonte (BR); Rodrigo Damazio Bovendorp, Belo Horizonte (BR); Rubens C. Levy, Sao Paulo (BR)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 15/487,298

(22) Filed: Apr. 13, 2017

Related U.S. Application Data

(63) Continuation of application No. 13/687,031, filed on Nov. 28, 2012, now abandoned.

(51) Int. Cl.
 *G06Q 30/02* (2012.01)
 *G06Q 50/00* (2012.01)

(52) U.S. Cl.
 CPC ......... *G06Q 30/0273* (2013.01); *G06Q 50/01* (2013.01)

(58) Field of Classification Search
 CPC ................................................. G06Q 30/0207
 See application file for complete search history.

(56) References Cited

U.S. PATENT DOCUMENTS

| | | | |
|---|---|---|---|
| 7,856,445 B2 | 12/2010 | Gross | |
| 8,611,929 B1 * | 12/2013 | Vandehey | H04W 4/02 455/456.3 |
| 2007/0124425 A1 | 5/2007 | Gross | |
| 2007/0168490 A1 | 7/2007 | Kent et al. | |
| 2007/0174340 A1 | 7/2007 | Gross | |

(Continued)

FOREIGN PATENT DOCUMENTS

WO  WO 2009/058528   5/2009

OTHER PUBLICATIONS

Muhammad Wasim, Vann Shahzadi, Qanita Ahmad, Dr. Waqar Mahmood; "Extracting and Modeling User Interests based on Social Media " (2011); IEEE p. 284-289 (Year: 2011).*

*Primary Examiner* — Sam Refai
*Assistant Examiner* — Rashida R Shorter
(74) *Attorney, Agent, or Firm* — Fish & Richardson P.C.

(57) ABSTRACT

Methods, systems, and apparatus, including computer programs encoded on a computer-readable storage medium, and including a method for creating content. The method comprises receiving an indication to promote a published content item, and parsing content in the published content item to identify candidate text/video/images for inclusion in a creative. The method further comprises assigning ranks to the candidate text/video/images based on one or more criteria. The method further comprises identifying a plurality of creative formats. The method further comprises, for each of the identified creative formats, identifying a corresponding set of text/video/images from the candidate text/video/images for inclusion in a candidate creative formatted in accordance with a given creative format and based at least in part on the ranked candidate text/video/images. The method further comprises ranking the candidate creatives, and generating at least one creative including a corresponding set of text/video/images based on the ranking of the candidate creatives.

20 Claims, 4 Drawing Sheets

(56) References Cited

U.S. PATENT DOCUMENTS

| | | |
|---|---|---|
| 2007/0192369 A1 | 8/2007 | Gross |
| 2008/0010270 A1 | 1/2008 | Gross |
| 2008/0109285 A1 | 5/2008 | Reuther et al. |
| 2008/0201222 A1 | 8/2008 | Lahaix |
| 2009/0030774 A1 | 1/2009 | Rothschild et al. |
| 2009/0048922 A1 | 2/2009 | Morgenstern et al. |
| 2009/0248516 A1 | 10/2009 | Gross |
| 2010/0010866 A1 | 1/2010 | Bal et al. |
| 2010/0088182 A1 | 4/2010 | Ryder et al. |
| 2010/0132049 A1* | 5/2010 | Vernal ................ G06F 21/6245 726/27 |
| 2011/0029388 A1 | 2/2011 | Kendall et al. |
| 2011/0087545 A1 | 4/2011 | Gross |
| 2011/0093331 A1 | 4/2011 | Metzler et al. |
| 2011/0153421 A1* | 6/2011 | Novikov ................ G06Q 30/02 705/14.52 |
| 2011/0258050 A1 | 10/2011 | Chan et al. |
| 2011/0288935 A1 | 11/2011 | Elvekrog et al. |
| 2012/0084160 A1 | 4/2012 | Badros et al. |
| 2012/0204096 A1 | 8/2012 | Kendall et al. |
| 2013/0013416 A1* | 1/2013 | Stein ................ G06Q 30/0251 705/14.66 |
| 2013/0014258 A1* | 1/2013 | Williams ........... G06Q 30/0241 726/24 |
| 2013/0246138 A1 | 9/2013 | Johnson et al. |
| 2013/0326354 A1 | 12/2013 | Anderson |
| 2014/0214533 A1* | 7/2014 | Box ................ G06Q 30/0261 705/14.49 |

* cited by examiner

PROMOTING CONTENT INTO A CREATIVE

CROSS-REFERENCE TO RELATED APPLICATION

This is a continuation of U.S. application Ser. No. 13/687,031, filed on Nov. 28, 2012, the disclosure of which is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user, such as a personal computer (PC), a smartphone, a laptop computer, or some other user device.

SUMMARY

In general, one innovative aspect of the subject matter described in this specification can be implemented in methods that include a computer-implemented method for creating content. The method comprises receiving an indication to promote a published content item. The method further comprises parsing, using one or more processors, content in the published content item to identify candidate text, video and/or images for inclusion in a creative. The method further comprises assigning ranks to the candidate text, video and/or images based on one or more criteria. The method further comprises identifying a plurality of creative formats. The method further comprises, for each of the identified creative formats, identifying a corresponding set of text, video and/or images from the candidate text, video and/or images for inclusion in a candidate creative formatted in accordance with a given creative format and based at least in part on the ranked candidate text, video and/or images. The method further comprises ranking the candidate creatives. The method further comprises generating at least one creative including a corresponding set of text, video and/or images based on the ranking of the candidate creatives.

These and other implementations can each optionally include one or more of the following features. The method can further comprise comparing performance information associated with two or more of the at least one generated creatives, and updating a campaign associated with the at least one generated creative based at least in part on the performance information. The method can further comprise selecting at least one of the at least one generated creatives to keep running in the campaign based on the performance information, and stopping remaining ones of the at least one generated creatives from running in the campaign. The method can further comprise augmenting the at least one creative with a social tool, including adding one or more social tools along with text, video and/or images in the creative. The social tool can include a follow or +1 control. Identifying the set of text, video and/or images can include identifying single sentences from text of the published content item and groups of sentences that each contain a first sentence of the text of the published content item. The published content item can be included in a blog or a social network activity stream. Creating one or more of the at least one candidate creatives can include using information from one or more profiles associated with a user that provides the indication to promote the published content item. The indication to promote the published content item can be received as a result of user selection of a promote control. The method can further comprise checking for a change in the published content item, and upon a determination that the published content item has changed by a threshold amount, updating an associated creative based at least in part on the change. Updating can include stopping the associated creative from running in a campaign when an update cannot be performed. A landing page associated with the at least one generated creative can be a user-published page for the user that initiated the indication to promote the published content item. The at least one creative format can include a banner format, a skyscraper format, and a box format. One or more criteria used to assign ranks to the candidate text, video and/or images can include a criteria based on an activity history associated with the user, including a history of posted text, video and/or images. The one or more criteria used to assign ranks to the candidate text, video and/or images can include criteria based on an activity history of one or more social network users associated with the published content item.

In general, another innovative aspect of the subject matter described in this specification can be implemented in computer program products that include a computer program product tangibly embodied in a computer-readable storage device and comprising instructions. The instructions, when executed by a processor, cause the processor to: receive an indication to promote a published content item; parse, using one or more processors, content in the published content item to identify candidate text, video and/or images for inclusion in a creative; assign ranks to the candidate text, video and/or images based on one or more criteria; identify a plurality of creative formats; for each of the identified creative formats, identify a corresponding set of text, video and/or images from the candidate text, video and/or images for inclusion in a candidate creative formatted in accordance with a given creative format and based at least in part on the ranked candidate text, video and/or images; rank the candidate creatives; and generate at least one creative including a corresponding set of text, video and/or images based on the ranking of the candidate creatives.

In general, another innovative aspect of the subject matter described in this specification can be implemented in systems that include a system for generating creatives. The system comprises a processor and a memory including instructions that when executed cause the processor to: receive an indication to promote a published content item; parse, using one or more processors, content in the published content item to identify candidate text, video and/or images for inclusion in a creative; assign ranks to the candidate text, video and/or images based on one or more criteria; identify a plurality of creative formats; for each of the identified creative formats, identify a corresponding set of text, video and/or images from the candidate text, video and/or images for inclusion in a candidate creative formatted in accordance with a given creative format and based at least in part on the ranked candidate text, video and/or images; rank the candidate creatives; and generate at least one creative including a corresponding set of text, video and/or images based on the ranking of the candidate creatives.

Particular implementations may realize none, one or more of the following advantages. Advertisement creatives can be generated automatically from content items, including user posts on social networks. The creatives that are generated can conform to various advertisement formats, e.g., to fit certain types, sizes and shapes of advertisement slots. Although in some scenarios the generated advertisements may not be monetized, the advertisements can generally add user interest, such as in a social network, and may lead to users paying more attention to advertisements that are monetized.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for using text, video and/or images from a user's published content to generate a creative (i.e., producing promoted content). For example, a process that includes a creative generator can analyze instances of user-published content, e.g., a post, an article, or any formatted or unformatted set of text, video and/or images/photos/pictures in a social network. For a given creative format, the creative generator can generate a corresponding set of images and text that can be used to generate one or more instances of a creative associated with the published content.

As an example, a user on a social network can select a promote control that is associated with a content item containing text, video and/or images. The user may elect to promote the content item, for example, automatically generating a creative that can be presented to other users, such as the user's friends in the social network. If another user clicks on the promoted content (e.g., the creative) generated in this way, for example, then that other user can be directed (or re-directed) to a landing page. One possible landing page can be the personal profile page of the user who promoted the content item.

Creatives that are generated in this way can have different formats, such as banner formats, skyscraper formats, or box formats. The format that is selected for the generated creative can depend on the size, shape and other factors of the elements (e.g., text, video and/or images) present in the generated content. Candidate creatives can be generated for each creative format that is suitable for each of the elements, alone or in combination. For example, creatives can be generated for banner, skyscraper, box and other formats. The candidate creatives can also be ranked based on various factors, e.g., such as how well the text/images fit in a given format (e.g., in a template), position inside the content item (e.g., prominence in the user post), sentence length, and/or rich formatting used (e.g., bold, italics, etc.). Other factors can be used, such as those discovered using natural language processing algorithms to determine which candidate creative best describes the subject of the post. Ranking can also be based on an activity history associated with the user, including a history of posted text, video and/or images, and/or an activity history of one or more social network users associated with the published content item. For example, text, video and/or images that have been more often used, accessed, shared, liked, etc., can be the basis of a higher-ranked candidate creative. At least one of the highest-ranked candidate creatives can then be chosen to be used, for example, as promoted content (e.g., as an advertisement) that is selectable to be presented to other users, including, for example, social network friends of the user.

Figure 1:
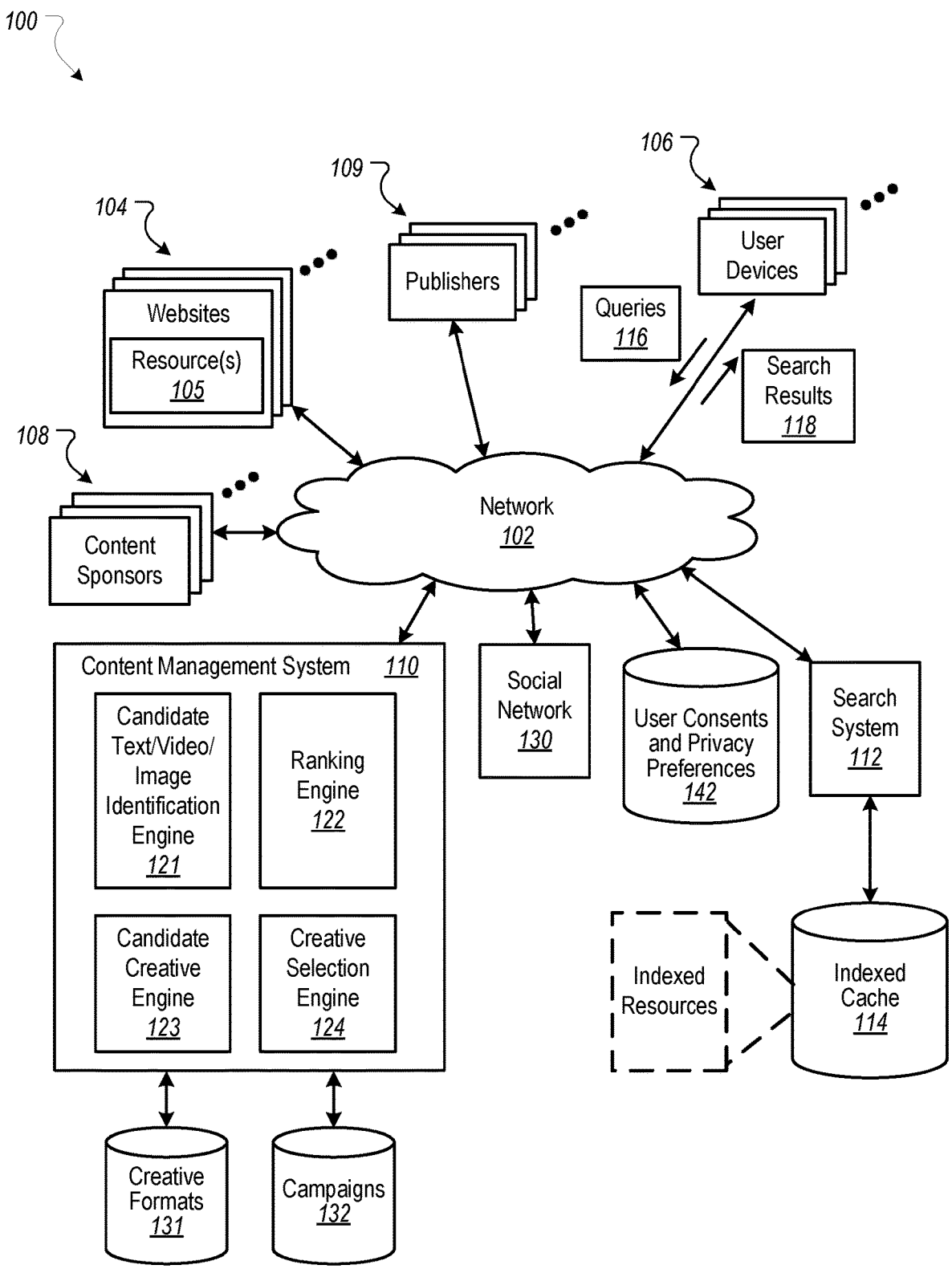
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and/or publishers 109.

In some implementations, the example environment 100 further includes at least one information network (e.g., social network 130) in which users can post content, share and/or comment on content, view and interact with news feeds, and/or interact with other users in the information network. The content can include text, images and other types of content. Examples of information networks include social networks, blogs, and/or other sources of content.

The environment can include plural data stores that are used in the process of generating creatives. For example, a data store of creative formats 131 can include definitions for different formats for creatives that can be used (e.g., online), including one or more of banner formats, skyscraper formats, or box formats. Other formats, such as those associated with other shapes and/or orientations, are possible. Each of the formats can be used, for example, by the content management system 110 to generate at least one creative that is based on that format and that is generated from content published by the user.

A data store of campaigns 132 can include, for example, multiple campaigns, including advertisement campaigns. The campaigns can include campaigns created by campaign sponsors and campaigns created by users, e.g., including campaigns generated from content published by users.

A data store of user consents and privacy preferences 142 can include information that the user has provided regarding when and how information about the user's published content can be used. In some implementations, specific user preferences can apply to text, video and/or images that are permitted to be used, and/or how and/or where the information is used. For example, a user can set one or more preferences such as "Do not allow my comments on social networks to be promoted for use in advertisements created by others," or "Only present creatives generated from my published content items to friends in my social network." In some implementations, before any operation is performed that may use creatives generated by the user or other users, one or more user preferences can be evaluated.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smart-phones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information, can be used and/or evaluated when selecting eligible content.

The content management system 110 can select from the eligible content items that are to be provided for presentation in slots of a resource or search results page based in some implementations on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

In some implementations, promoted content can be different from conventional advertisements, e.g., in their format and/or how they are handled. For example, promoted content may or may not be combined (e.g., for bidding in auctions) with paid content items (e.g., advertisements). In some implementations, promoted content may be more personal in nature, e.g., they are not monetized and instead are presented in activity streams, such as for friends of the user who promoted the content.

The content management system 110 can include plural engines. For example, a candidate text/image identification engine 121 can parse content in published content items to identify candidate text, video and/or images for inclusion in a creative.

A ranking engine 122, for example, can rank the candidate text/images from a user's published content and/or candidate creatives. The ranking can be based on various factors, such as how well the text/images fit in a pre-defined format (e.g., in a template), their position inside the published content (e.g., prominence in the user post), sentence length, and/or rich formatting used (e.g., bold, italics, etc.). Other factors can be used, such as those derived using natural language processing algorithms to determine which candidate text best describes the subject of the published content. In some implementations, the ranking can also be based on one or more user action-related criteria, such as actions performed by the user (and/or other users) that are associated with the published content. The ranking engine 122 can also rank candidate creatives that are generated from the candidate text/images.

A candidate creative engine 123 can generate candidate creatives using a set of text, video and/or images (e.g., that have been ranked by the ranking engine 122). For example, there can be one or more candidate creatives generated for each format identified from the creative formats 131.

A creative selection engine 124 can select/generate at least one creative, e.g., from a set of ranked candidate creatives. Each creative can include one or more of the text, video and/or images from the published content. One purpose of selecting a "best" creative, e.g., a creative that may be ranked higher than other candidate creatives, is to provide a creative that is likely to capture the attention of users to whom it is displayed (e.g., likely to lead to a conversion).

A conversion can be said to occur when a user performs a particular transaction or action related to a content item provided with a resource, in a feed (e.g., an activity stream) or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as sharing or re-publishing the content item. Other actions that constitute a conversion can also be used.

In some implementations, the likelihood that a conversion will occur can be improved, such as by presenting content that may be of more interest to a user, e.g., a content item that results from a user promoting previously published content. For example, such content may be more of interest to users because they include content from a user's friends. This can increase the likelihood of a conversion, for example, by providing content to users that may be more of interest to users than otherwise would be the case in which published content is not used.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 2:
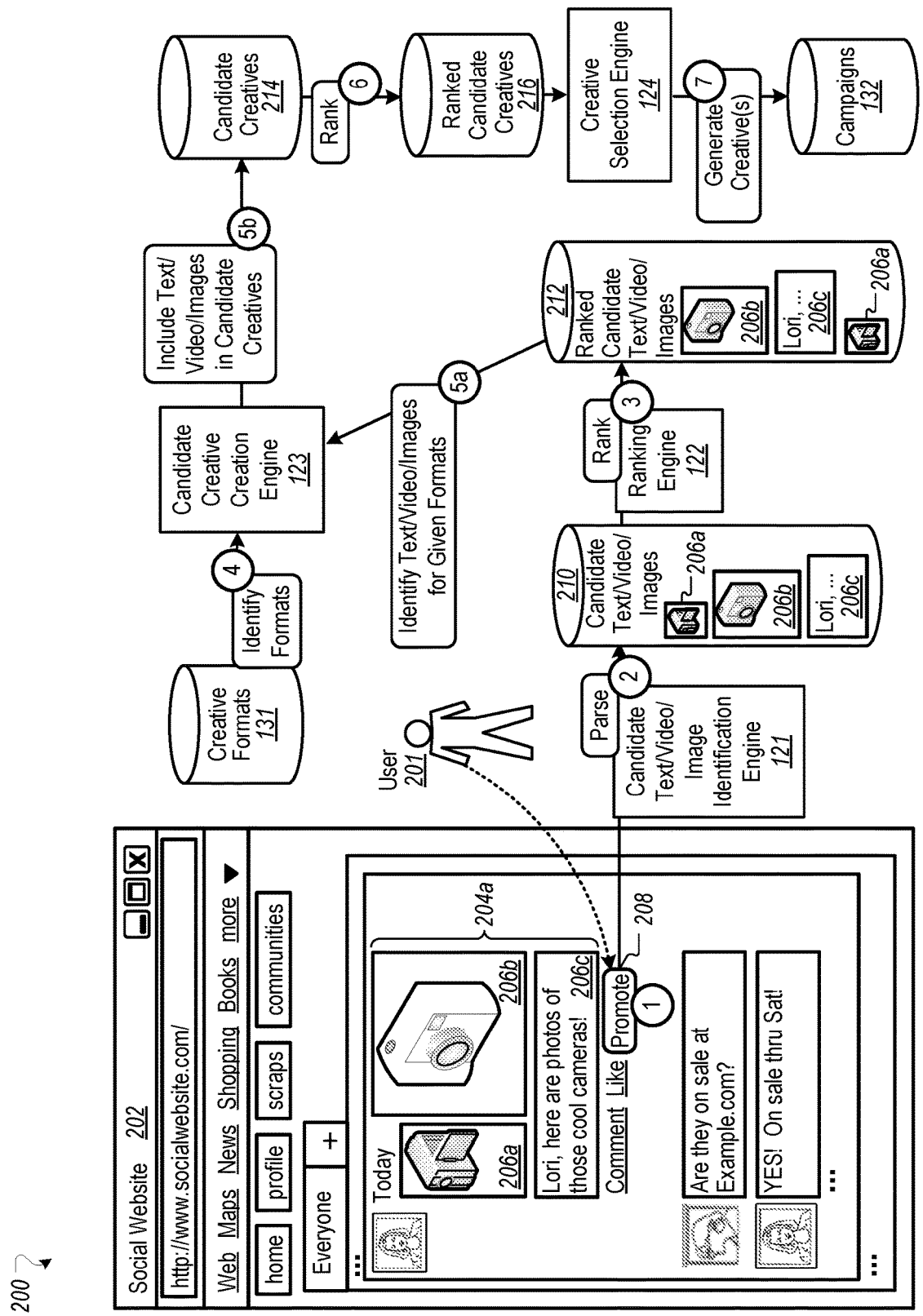
FIG. 2 shows an example system for generating creatives in different formats.

FIG. 2 shows an example system 200 for generating creatives in different formats. For example, a user can promote a content item 204a, e.g., a blog entry, or a posting on the user's profile or in the user's news feed on a social website 202. The promotion can result in the creation of one or more creatives (e.g., advertisement creatives). In some implementations, the system 200 can be part of the environment 100 that is described above with reference to FIG. 1. An example sequence of events (e.g., with numbered steps 1 through 7) follows for generating a creative using the system 200.

In some implementations, before published content is allowed to be promoted and used to generate creatives in the system 200, the content management system 110 can check the user consents and privacy preferences 142 to see, for example, if the user has consented to such practices. Some users may specify, for example, that information in their social network profile and/or news feed is not to be used in generating content, e.g., advertisements, that are to be provided to others. Other settings may allow the user to designate conditions and ways that promotion is allowed to occur, e.g., to produce creatives that are to be shown only to the user's friends, or to select content that does not contain content that originated from another user. For example, a user may wish to limit promoting content in a social network posting made by the user to just that user's original content, and not including, e.g., comments by the user's social network friends. In another example, a user's friends in a social network may themselves set limits on how their posted content is used. For example, a user can specify that posted comments on a friend's profile page or news feed are not to be included in a creative if the user promotes a particular content item.

In some implementations, a first step 1 of the sequence of steps can occur, for example, when a user using the social website 202 publishes the content item 204a, e.g., a posting on the user's profile or in the user's news feed. The content item 204a in this example includes image 206a, image 206b, and text 206c. For example, the images 206a-206b can be photos that the user has uploaded to the social website 202 or has selected in some other way to be included in the content item 204a. The text 206c, for example, can be the user's comment regarding the photos, or may be other users' comments. Other portions of the content item 204a can exist, e.g., other images, other text, links, and/or any other portions of content that can be included in a content item. The user may decide to promote the content item 204a, for example, in order to create an advertisement for friends to see, e.g., an advertisement that includes one or more of the images 206a-206b and/or text 206c. The content management system 110, for example, can receive an indication that the user desires to promote the published content item 204a, e.g., upon user selection of a promote control 208.

At step 2, the candidate text/image identification engine 121, for example, can parse content in the published content item 204a to identify candidate text, video and/or images 210 for inclusion in a creative. In the current example, the candidate text, video and/or images 210 can include the images 206a-206b and text 206c and may also include other portions of the published content item 204a, e.g., that exist at the time that the user published the content item.

At step 3, the ranking engine 122, for example, can rank the candidate text/images 210 based on one or more criteria, e.g., to produce ranked candidate text/images 212. For example, as indicated by the order of elements in ranked candidate text/images 212, the image 206b may have the highest rank, followed by the text 206c and the image 206a (e.g., with the lowest rank). In some implementations, candidate images can be ranked based on their dimensions and aspect ratio, e.g., how well each image fits into an available predefined space in a creative template.

At step 4, creative formats are identified, such as by accessing available creative formats 131. Example formats include banner formats, skyscraper formats, and box formats. Other formats, such as other shapes and/or orientations, can also be used.

At step 5a, for each of the identified creative formats, the candidate creative creation engine 123, for example, can identify a corresponding set of text, video and/or images from the ranked candidate text/images 212. For example, the highest ranking candidate text/image that satisfies the format requirements (e.g., max size) of each text and graphical element in the creative format can be selected. In one example, for the box format, the candidate creative creation engine 123 may include images 206a-206b. In another example, for the banner format, the candidate creative engine creation 123 may identify the text 206c or some other text and/or image (or portion thereof) that would be suitable for presentation in a banner creative. In yet another example, for the skyscraper format, the candidate creative creation engine 123 may identify an image (or portion thereof) that is tall and narrow and that would be suitable for presentation in a skyscraper format creative.

At step 5b, an identified image(s) and/or text can be included in a candidate creative, each one being formatted in accordance with a particular creative format and based at least in part on the ranked candidate text, video and/or images. For example, the resulting candidate creatives 214 can include separate box-format creatives for each of the images 206a-206b, a separate banner-format creative for the text 206c, and other creatives that have box, banner or skyscraper formats and include text/images from the published content item. In some implementations, each creative can include (e.g., embedded in the creative) one or more social tools, e.g., follow, +1 or other tool(s) with which another user who views the creative can interact. Multiple creatives can be created from the text 206c, e.g., based on each sentence in the text 206c and groups of sentences that each begins with the first sentence.

In some implementations, templates can be used during the process of generating candidate creatives. For example, the templates can include spaces or place-holders for images that can be filled with images from the published content item (e.g., the user post) or from the user's social profile. Images can be automatically scaled, cropped and/or have bands (e.g., blank or auto-filled bands) added to them in order to properly fit the spaces of a given template. Other features can be used, including smart image cropping (e.g., using frequency analysis, feature and face detection to avoid cropping over these features), and seam carving, such as in situations to improve matching of candidate images to spaces in a template.

At step 6, the ranking engine 122, for example, can rank the candidate creatives 214. As a result of the ranking, ranked candidate creatives 216 can include, for example, different candidate creatives that include one or more of images 206a-206b and text 206c. For example, the creatives can be ranked based at least in part on the likelihood that users will interact with the creatives. For single- and multi-sentence text candidate creatives, the ranking of candidate creatives can also be based on their location in the published content, sentence length, rich formatting used (e.g., bold, italics) or by using natural language processing algorithms to determine which candidates better describe the subject of the published content.

At step 7, the creative selection engine 124, for example, can generate at least one creative including a corresponding set of text, video and/or images based on the ranking. In some implementations, creatives that are generated can be used to automatically populate campaigns, e.g., advertisement campaigns, for the user's social network profile page. Users can then control and set budgets for the campaigns. Because an automatic process is used to select text/image portions from published content to use in creatives (e.g., based on computed scores and ranking), selection criteria, including keywords by which the creatives can be selected, can also be generated automatically.

The steps 1-7 provide an example sequence of steps for how published content, can be used to generate creatives. Some of the steps and associated processing can be combined to achieve the same or similar results.

Figure 3:
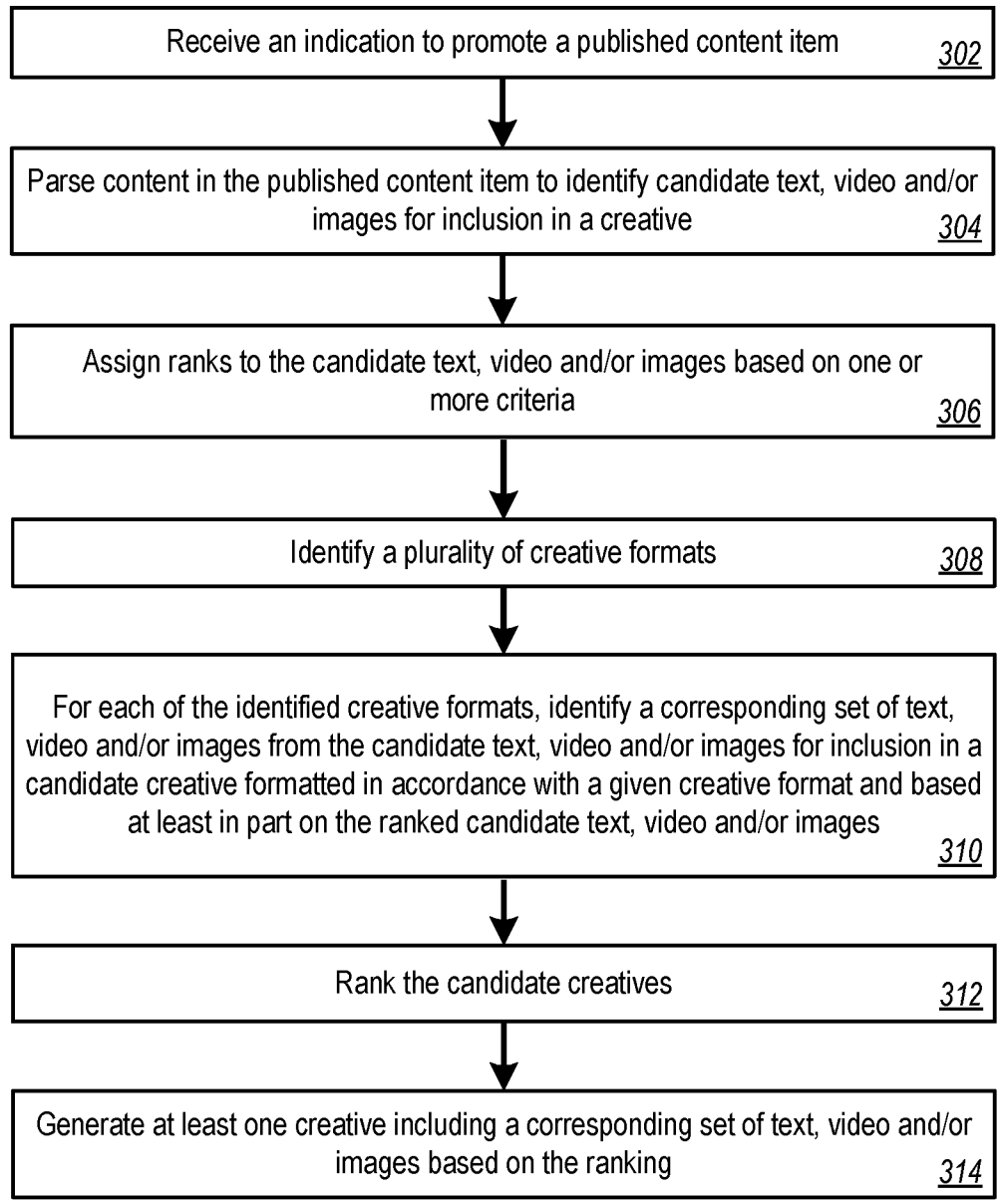
FIG. 3 is a flowchart of a process for generating creatives in different formats using text, video and/or images from a user's published content.

FIG. 3 is a flowchart of an example process 300 for generating creatives in different formats using text, video and/or images from a user's published content. For example, the process 300 can be used to produce advertisement creatives from published content on a user's social network, blog or profile, and the advertisement creatives can be presented to other users in a social network. In some implementations, the content management system 110 can perform steps of the process 300 using instructions that are executed by one or more processors. FIGS. 1-2 are used to provide example structures for performing the steps of the process 300.

An indication to promote a published content item is received (302). For example, the user 201 can select the promote control 208 to promote the content item 204a. The content management system 110, for example, can receive the indication, e.g., from a user device 106 associated with the user. The published content item 204a can be included, for example, in a blog or an activity stream of a social network, e.g., on the user's profile page or in a news feed.

Content in the published content item is parsed to identify candidate text, video and/or images for inclusion in a creative (304). For example, the candidate text/image identification engine 121 can parse content in the published content item 204a to identify candidate text, video and/or images 210, e.g., including the images 206a-206b and text 206c.

Ranks are assigned to the candidate text, video and/or images based on one or more criteria (306). For example, the ranking engine 122 can rank the candidate text/images 210 based on one or more criteria to produce ranked candidate text/images 212. As a result of the ranking, the ranked candidate text/images 212 can end up being ranked, for example, in the order of images 206b, text 206c and image 206a.

In some implementations, the one or more criteria used to assign ranks to the candidate text, video and/or images can include a criteria based on an activity history associated with the user, including a history of posted text, video and/or images. For example, the ranking engine 122 can assign higher ranks to candidate text, video and/or images that the user has posted more often than other candidate text, video and/or images. In some implementations, candidate text and images that have been posted only once may be assigned lower ranks.

In some implementations, the one or more criteria used to assign ranks to the candidate text, video and/or images can include criteria based on an activity history of one or more social network users associated with the published content item. As an example, the ranking engine 122 can assign higher ranks to candidate text, video and/or images that have received relatively higher numbers of affirmative actions (e.g., likes, shares, etc.) and/or received more comments from other users. Candidate text and images that receive little or no interaction from other users may be assigned lower ranks.

A plurality of creative formats is identified (308). For example, the candidate creative creation engine 123 can access information about different banner, skyscraper, and box creative formats from the creative formats 131.

For each of (or a plurality of) the identified creative formats, a corresponding set of text, video and/or images is identified from the candidate text, video and/or images for inclusion in a candidate creative formatted in accordance with a given creative format and based at least in part on the ranked candidate text, video and/or images text, video and/or images (310). The result, for example, can be one or more candidate creatives 214 for each of (or the plurality of) the creative formats 131 and containing ranked candidate text/images 212. For example, there can be one or more candidate creatives for each of the image 206a, image 206b, and text 206c.

In some implementations, identifying a corresponding set of text from the candidate text can include identifying single sentences from text of the published content item and groups of sentences, where each group contains a first sentence of the text of the published content item. For example, a candidate creative can be created for each sentence in the post, and multi-sentence candidates can also be created starting at the beginning of the published content. Based on a content item that is a four-sentence posting by the user, for example, there can be four single-sentence candidate creatives and three multi-sentence candidate creatives, e.g., creatives based on the first two, three and four sentences, respectively, in the same sequence as they appear in the text.

In some implementations, creating the candidate creatives can include using information from one or more profiles associated with the user that provided the indication to promote the published content item in the candidate creative. For example, the candidate creative creation engine 123 can access the user's profile information in the social network 130 and incorporate some of the information into one or more of the candidate creatives 214.

The candidate creatives are ranked (312). As an example, the ranking engine 122 can rank the candidate creatives 214 based on one or more criteria, e.g., to produce ranked candidate creatives 216. For example, as a result of the ranking, candidate creatives of different formats can be ranked in order as to how well they fit the format of a slot (e.g., an advertisement slot). For single- and multi-sentence text candidate creatives, the ranking of candidate creatives can also be based on the position of the associated text in the published content (e.g., inside the user post), sentence lengths, rich formatting used (e.g., bold, italics) and/or by using natural language processing algorithms to determine which candidates better describe the subject of the post.

At least one creative is generated including a corresponding set of text, video and/or images based on the ranking (314). For example, the creative selection engine 124 can select at least one of the ranked candidate creatives 216 to be generated as a creative. The generated creatives can be stored in the campaigns 132 and may include, for example, at least one of each of the highest-ranked box, banner and skyscraper format creatives.

In some implementations, one or more of the generated creatives can have an associated landing page that is a user-published page for the user (e.g., User A) that initiated the indication to promote the published content item. In this example, when another user (e.g., User B) clicks on or otherwise interacts with the creative, a redirection can occur that navigates User B to a landing page on User A's user-published page.

In some implementations, the creative that is generated can be part of the published content item, or may be the entire published content item itself. For example, the creative selection engine 124 can select the content item 204a itself instead of one of the candidate creatives. The selection can be part of a system, for example, for selecting, from among a set of content items, those that are more likely to be successful (e.g., leading to user interactions).

In some implementations, the process 300 further comprises comparing performance information associated with two or more of the generated creatives, selecting at least one of the generated creatives based at least in part on the performance information, and updating a campaign based on the performance information (e.g., to stop remaining ones of the at least one generated creatives from running).

In some implementations, the process 300 further includes augmenting the at least one creative with a social tool, including adding one or more social tools to text, video and/or images in the creative. For example, the candidate creative creation engine 123 can include one or more social tools such as follow, +1 or other tools in or along with the candidate creatives that are generated.

In some implementations, the process 300 further includes checking for a change in the published content item, and upon a determination that the published content item has changed (e.g., by a threshold amount), updating an associated generated creative based at least in part on the change. For example, if text, video and/or images in the user's blog entry are added, modified or deleted, e.g., on the social network, then the content management system 110 or some other system or component can update the associated generated creative to be consistent with the change. This may occur selectively, for example, if the published blog entry changes by a pre-determined amount, e.g., at least 30% of the text changed, at least two images were modified in some way, at least one image was added or deleted, or some other measurable significant change occurred to the published blog entry. Alternatively, changes can be made based on time lapse, such as after an amount of time has elapsed since the original content was published. In some implementations, if an update to the associated creative cannot be made, then the content management system 110 can alert the content sponsor or otherwise effectuate a change to a given campaign (e.g., stop the associated creative from running).

Figure 4:
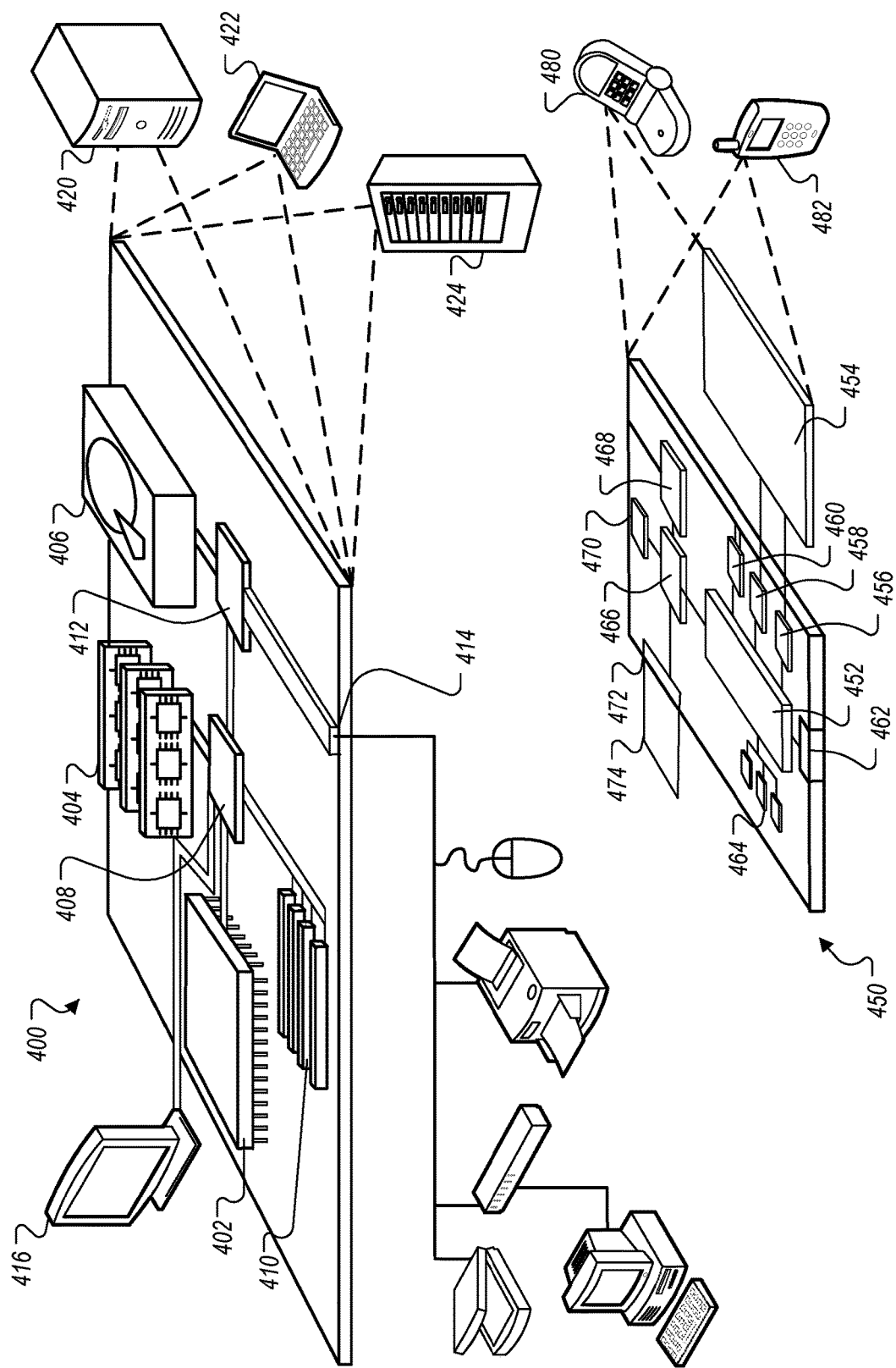
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying, by one or more computers, an online post of a particular user that has been published by the particular user;
   parsing, by the one or more computers, the online post that has been published by the particular user to identify multiple different content elements of the online post;
   generating, by the one or more computers and using the multiple different content elements of the online post of the particular user, a content item that differs from the online post that was published by the particular user and includes one or more of the multiple different content elements that were identified in the online post;
   distributing, by the one or more computers, the generated content item to one or more different users that are part of a social network of the particular user;
   detecting, by the one or more computers, a change to the online post after the online post was published by the particular user, including:
      determining, by the one or more computers, that an amount of the identified multiple different content elements of the online post that have been changed since the online post was published by the particular user exceeds a predetermined threshold;
   modifying, by the one or more computers, the generated content item to reflect the detected change to the post that was published by the particular user; and
   distributing, by one or more computers, the modified content item to the one or more different users that are part of the particular user's social network.

2. The computer-implemented method of claim 1, further comprising:
   determining performance information of the generated content item; and
   updating a campaign that includes the generated content item using at least the performance information.

3. The computer-implemented method of claim 1, further comprising:
   adding a social tool to the generated content item, including adding one or more social tools along with text, video, and/or images in the generated content item.

4. The computer-implemented method of claim 3, wherein the social tool includes a follow or +1 control.

5. The computer-implemented method of claim 1, wherein parsing the online post comprises identifying individual sentences from text of the online post.

6. The computer-implemented method of claim 1, wherein identifying the online post comprises identifying the online post in a blog or a social network activity stream.

7. The computer-implemented method of claim 1, wherein generating the content item includes using information from one or more profiles of a user that provided the online post.

8. The computer-implemented method of claim 1, wherein a landing page of the generated content item is a user-published page for the particular user that provided the online post.

9. A non-transitory computer-readable medium storing instructions, that when executed, cause one or more processors to perform operations including:
   identifying an online post of a particular user that has been published by the particular user;
   parsing the online post that has been published by the particular user to identify multiple different content elements of the online post;
   generating, using the multiple different content elements of the online post of the particular user, a content item that differs from the online post that was published by the particular user and includes one or more of the multiple different content elements that were identified in the online post;
   distributing the generated content item to one or more different users that are part of a social network of the particular user;
   detecting a change to the online post after the online post was published by the particular user, including:
      determining that an amount of the identified multiple different content elements of the online post that have been changed since the online post was published by the particular user exceeds a predetermined threshold;
   modifying the generated content item to reflect the detected change to the post that was published by the particular user; and
   distributing the modified content item to the one or more different users that are part of the particular user's social network.

10. The non-transitory computer program medium of claim 9, the operations further comprising:
   determining performance information of the generated content item; and
   updating a campaign that includes the generated content item using at least the performance information.

11. The non-transitory computer program medium of claim 9, the operations further comprising adding a social tool to the generated content item, including adding one or more social tools along with text, video, and/or images in the generated content item.

12. The non-transitory computer program medium of claim 11, wherein the social tool includes a follow or +1 control.

13. The non-transitory computer program medium of claim 9, wherein parsing the online post comprises identifying individual sentences from text of the online post.

14. The non-transitory computer program medium of claim 9, wherein the identifying the online post comprises identifying the online post in a blog or a social network activity stream.

15. A system comprising:
one or more processors; and
one or more memory elements including instructions that, when executed, cause the one or more processors to perform operations including:
identifying an online post of a particular user that has been published by the particular user;
parsing the online post that has been published by the particular user to identify multiple different content elements of the online post;
generating, using the multiple different content elements of the online post of the particular user, a content item that differs from the online post that was published by the particular user and includes one or more of the multiple different content elements that were identified in the online post;
distributing the generated content item to one or more different users that are part of a social network of the particular user;
detecting a change to the online post after the online post was published by the particular user, including:
determining that an amount of the identified multiple different content elements of the online post that have been changed since the online post was published by the particular user exceeds a predetermined threshold;
modifying the generated content item to reflect the detected change to the post that was published by the particular user; and
distributing the modified content item to the one or more different users that are part of the particular user's social network.

16. The system of claim 15, the operations further comprising:
determining performance information of the generated content item; and
updating a campaign that includes the generated content item using at least the performance information.

17. The system of claim 15, the operations further comprising adding a social tool to the generated content item, including adding one or more social tools along with text, video, and/or images in the generated content item.

18. The system of claim 17, wherein the social tool includes a follow or +1 control.

19. The system of claim 15, wherein parsing the online post comprises identifying individual sentences from text of the online post.

20. The system of claim 15, wherein the identifying the online post comprises identifying the online post in a blog or a social network activity stream.

* * * * *

UNITED STATES PATENT AND TRADEMARK OFFICE
CERTIFICATE OF CORRECTION

PATENT NO. : 10,580,045 B1
APPLICATION NO. : 15/487298
DATED : March 3, 2020
INVENTOR(S) : Leal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 236 days.

Signed and Sealed this
Twenty-fourth Day of November, 2020

Andrei Iancu
*Director of the United States Patent and Trademark Office*